(12) United States Patent
Kumar

(10) Patent No.: US 9,201,937 B2
(45) Date of Patent: *Dec. 1, 2015

(54) RAPID PROVISIONING OF INFORMATION FOR BUSINESS ANALYTICS

(71) Applicant: International Business Machines Corporation, Armonk, NY (US)

(72) Inventor: Manoj Kumar, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,597

(22) Filed: Mar. 22, 2014

(65) Prior Publication Data

US 2014/0207729 A1 Jul. 24, 2014

Related U.S. Application Data

(63) Continuation of application No. 13/675,026, filed on Nov. 13, 2012.

(51) Int. Cl.
 *G06F 17/30* (2006.01)
(52) U.S. Cl.
 CPC .......... *G06F 17/30563* (2013.01); *G06F 17/30* (2013.01)
(58) Field of Classification Search
 None
 See application file for complete search history.

(56) References Cited

U.S. PATENT DOCUMENTS

| | | | |
|---|---|---|---|
| 7,580,944 B2 | 8/2009 | Zhuge et al. | |
| 7,590,972 B2 | 9/2009 | Axelrod et al. | |
| 2004/0172237 A1* | 9/2004 | Saldanha et al. | 704/4 |
| 2005/0256889 A1* | 11/2005 | McConnell | 707/100 |
| 2006/0212530 A1* | 9/2006 | O'Farrell et al. | 709/212 |
| 2008/0016040 A1* | 1/2008 | Jones et al. | 707/3 |
| 2008/0086409 A1* | 4/2008 | Moorman et al. | 705/38 |
| 2010/0094770 A1 | 4/2010 | Sachedina et al. | |
| 2010/0211515 A1* | 8/2010 | Woodings et al. | 705/320 |
| 2010/0211586 A1* | 8/2010 | Dettinger et al. | 707/766 |
| 2011/0066590 A1 | 3/2011 | Chang et al. | |
| 2011/0093487 A1 | 4/2011 | Le Biannic et al. | |
| 2012/0084330 A1* | 4/2012 | Huynh | 707/810 |
| 2013/0198219 A1* | 8/2013 | Cohen et al. | 707/760 |

FOREIGN PATENT DOCUMENTS

| | | |
|---|---|---|
| CN | 1506879 | 6/2004 |
| EP | 1482419 | 12/2004 |

OTHER PUBLICATIONS

Chen, S. (2010), "Cheetah: a high performance, custom data warehouse on top of MapReduce," Proceedings of the VLDB Endowment, vol. 3, No. 2, pp. 1459-1468.*

(Continued)

*Primary Examiner* — Jay Morrison
(74) *Attorney, Agent, or Firm* — VanLeeuwen & VanLeeuwen; Steve Kurlowecz

(57) ABSTRACT

An approach is provided in which a system creates schema terms based upon matching input data query requirements to industry terms. In turn, the system generates a query and an associative map, which includes data organized according to the schema terms. The system executes the query, which retrieves the data from the associative map and loads the data into one or more storage areas.

8 Claims, 9 Drawing Sheets

(56) References Cited

OTHER PUBLICATIONS

Yu Qiancheng, "Metadata Integration Architecture in Enterprise Data Warehouse System", 2010 2nd International Conference on Information Science and Engineering, Hangzhou, China, Dec. 2010, pp. 340-343.

* cited by examiner

RAPID PROVISIONING OF INFORMATION FOR BUSINESS ANALYTICS

BACKGROUND

The present disclosure relates to dynamically generating associative maps and queries according to schema terms based on industry models for real-time business analytics information provisioning.

Provisioning information for business analytics typically involves provisioning the information from operational data stores (ODSs) into an enterprise data warehouses (EDWs), and finally into OLAP (OnLine Analytical Processing) storage areas for analysis. Designing the schema for provisioning the information into the EDWs requires an understanding of data requirements of the OLAP storage areas.

Since the movement of data from the ODS's to EDWs and into the OLAP storage areas is currently programmed by database programmers, the process is typically time consuming and expensive. Consequently, most organizations invest a substantial amount of money and up-front time to evaluate current requirements and anticipate future requirements for business analytics information provisioning.

BRIEF SUMMARY

According to one embodiment of the present disclosure, an approach is provided in which a system creates schema terms based upon matching input data query requirements to industry terms. In turn, the system generates a query and an associative map, which includes data organized according to the schema terms. The system executes the query, which retrieves the data from the associative map and loads the data into one or more storage areas.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
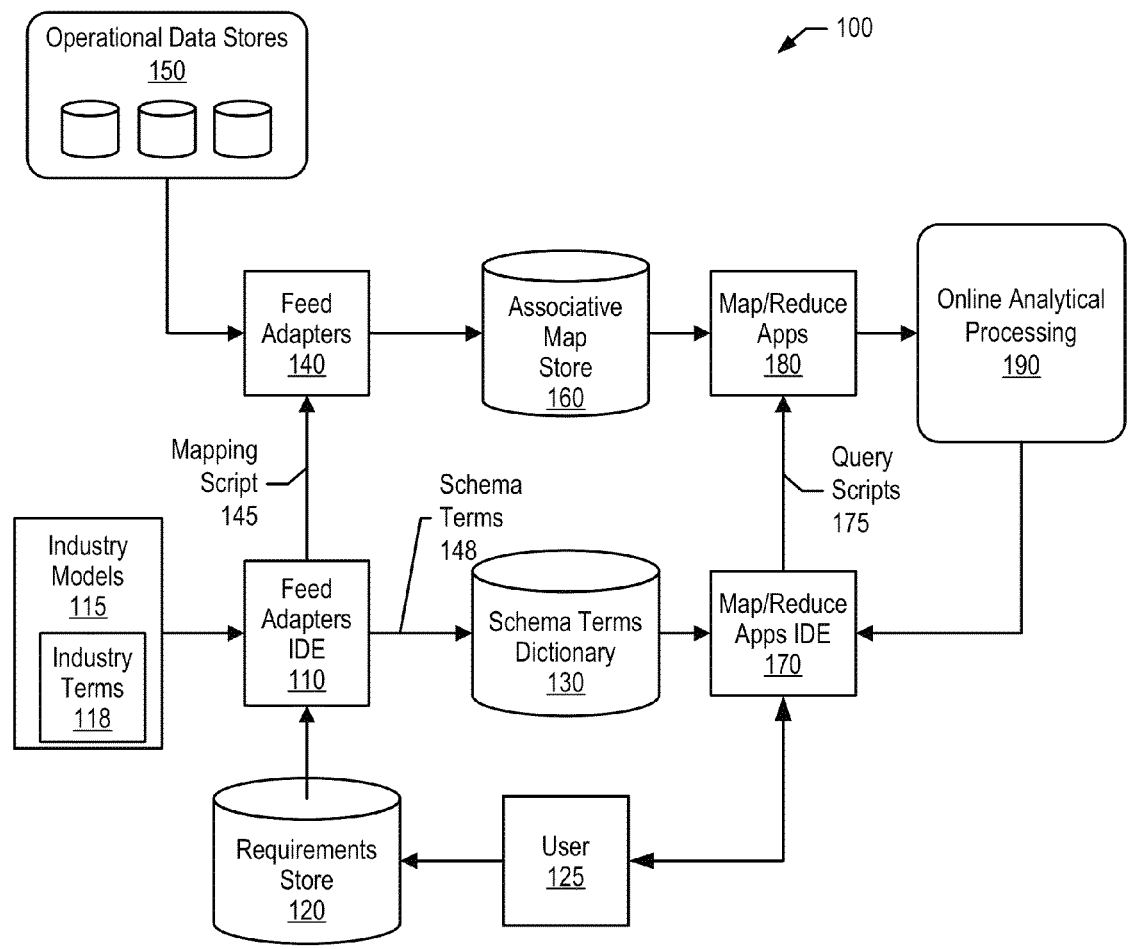
FIG. 1 is a diagram showing a system dynamically creating an associative map that includes provisioned information available to a user for business analytics.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a system dynamically creating an associative map that includes provisioned information available to a user for business analytics. System 100 generates schema terms 148 by matching user data requirements (stored in requirements store 120) with industry terms 118 included in industry models 115. As such, system 100 utilizes schema terms 148 as column names and row tags to map information stored in operational data stores 150 into an associative map that is stored in associative map store 160 (e.g., an HBase database). In addition, analytic applications developers (user 125) access schema terms 148 from the schema term dictionary 130 to view available data types and write query scripts 175 accordingly.

Feed adapters integrated development environment (IDE) 110 retrieves general user data requirements from requirements store 120 that, for example, may be standard industry requirements (e.g., healthcare industry requirements). Feed adapters IDE 110 matches each of the general user data requirements with standard industry terms 118 included in industry models 115. For each match, feed adapters IDE 110 stores a schema term (schema terms 148) corresponding to the matched industry term in schema terms dictionary 130 (see FIG. 2 and corresponding text for further details). When one of the general user data requirements does not match one of industry terms 118, feed adapters IDE 110 creates a new schema term (included in schema terms 148) and stores the new schema term in schema terms dictionary 130. System 100 proceeds to evaluate the general user data requirements and generate/store a schema term for each general user data requirement (see FIG. 5 and corresponding text for further details).

In one embodiment, user 125 adds application-specific data requirements to requirements store 120 that correspond to his/her specific data requirements (e.g., emergency room information). In turn, feed adapters IDE 110 retrieves the application-specific data requirements from requirements store 120 and checks whether schema terms dictionary 130 includes a schema term for each of the application-specific data requirements. When feed adapters IDE 110 identifies an application-specific data requirement that does not have a corresponding schema term stored in schema terms dictionary 130, feed adapters IDE 110 proceeds through steps similar to those discussed above to match the application-specific data requirement with an industry term in industry models 115 or generate a new schema term (see FIG. 6 and corresponding text for further details).

Figure 3:
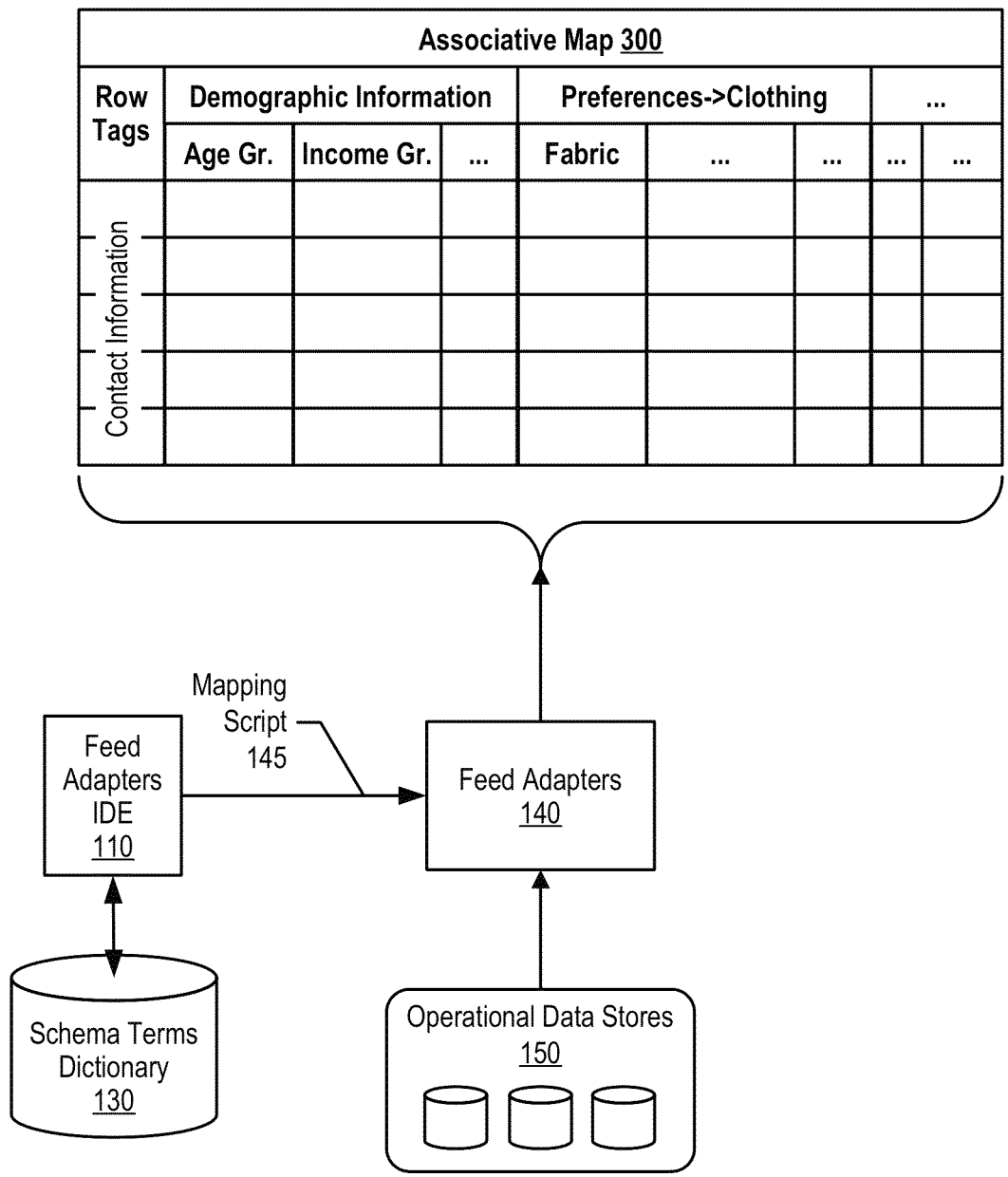
FIG. 3 is a diagram showing a feed adapter IDE generating a mapping script.

When each of the application-specific data requirements have a corresponding schema term stored in schema terms dictionary 130, feed adapters IDE 110 creates mapping script 145, which includes the schema terms as column names and/or row tags (see FIG. 3 and corresponding text for further details). Feed adapters 140 (e.g., application program) loads mapping script 145 and generates an associative map retrieved from data stored in operational data stores 150. In turn, feed adapters 140 stores the associative map in associative map store 160.

User 125 uses map/reduce applications IDE 170 to view the schema terms in schema terms dictionary 130 and select application-specific schema terms to generate queries (query scripts 175). In turn, map/reduce applications 180 loads query scripts 175 and extracts data from the associative map stored in associative map store 160 and loads the requested data into online analytical processing 190's storage areas.

In one embodiment, when user 125 wishes to generate a new query with new types of data, user 125 stores new application-specific data requirements in requirements store 120 and, in turn, feed adapters IDE 110 generates new application-specific schema terms 148 and mapping script 145, which dynamically creates a new associative map in associative map store 160. User 125 may then access the new application-specific schema terms via map/reduce applications IDE 170 and create a new query script 175, which extracts the new data from the new associative map and loads the new data in online analytical processing 190's storage areas.

Figure 2:
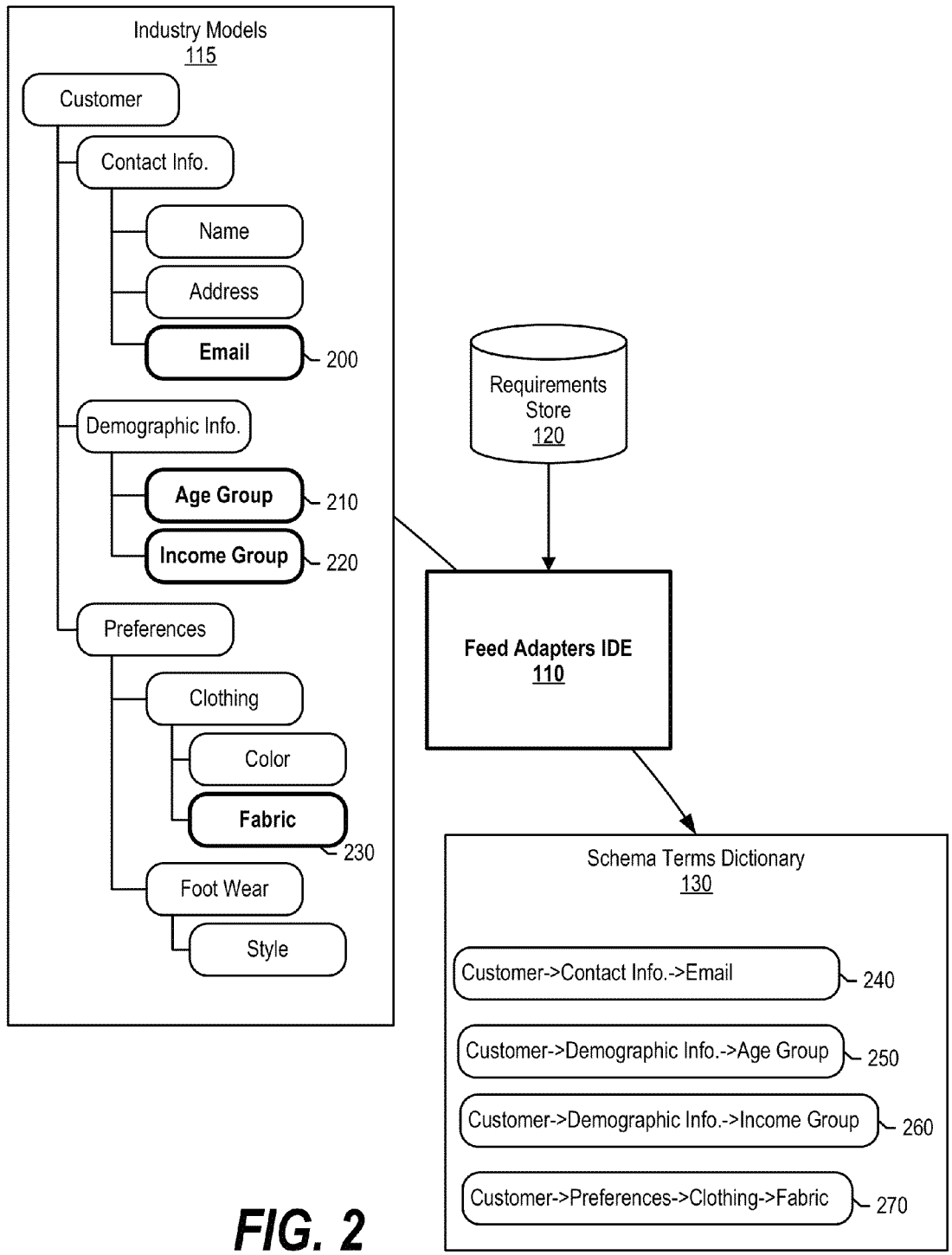
FIG. 2 is a diagram showing a feed adapter IDE generating schema terms by matching user data requirements with industry terms.

FIG. 2 is a diagram showing a feed adapter IDE generating schema terms from matching user data requirements with industry terms. Feed adapters IDE 110 retrieves user data requirements (general and/or application-specific) from requirements 120 and matches them against industry models 115. The example shown in FIG. 2 shows that that the user data requirements match industry terms 200, 210, 220, and 230. As such, feed adapters IDE 110 creates and stores schema terms 240, 250, 260, and 270 in schema terms dictionary 130.

In one embodiment, the schema terms include directory hierarchy information such that allows a mapping script to instruct feed adapters 140 to create an organized associative map. For example, schema terms 250 and 260 correspond to industry terms 210 and 220, respectively. Each of schema terms 250 and 260 include "customer->demographic information" directories that correspond to locations of industry terms 210 and 220 in industry models 115. As such, an associative map may be generated that groups schema terms 250 and 260 into a "customer->demographic information" grouping (see FIG. 3 and corresponding text for further details).

FIG. 3 is a diagram showing a feed adapter IDE generating a mapping script that instructs a feed adapter to generate an associative map from data stored in operational data stores 150. Feed adapters IDE 110 uses schema terms stored in schema terms dictionary 130 to create mapping script 145. Feed adapters 140 retrieves data from operational data stores 150 and generates associative map 300. Associative map 300 includes the schema terms as column names and also includes the schema terms as row tags where applicable (e.g., contact information shown in FIG. 3). As can be seen, associative map 300 includes an organized mapping that groups "age group" and "income group" under "demographic information" according to entries 250 and 260 shown in FIG. 2.

Figure 4:
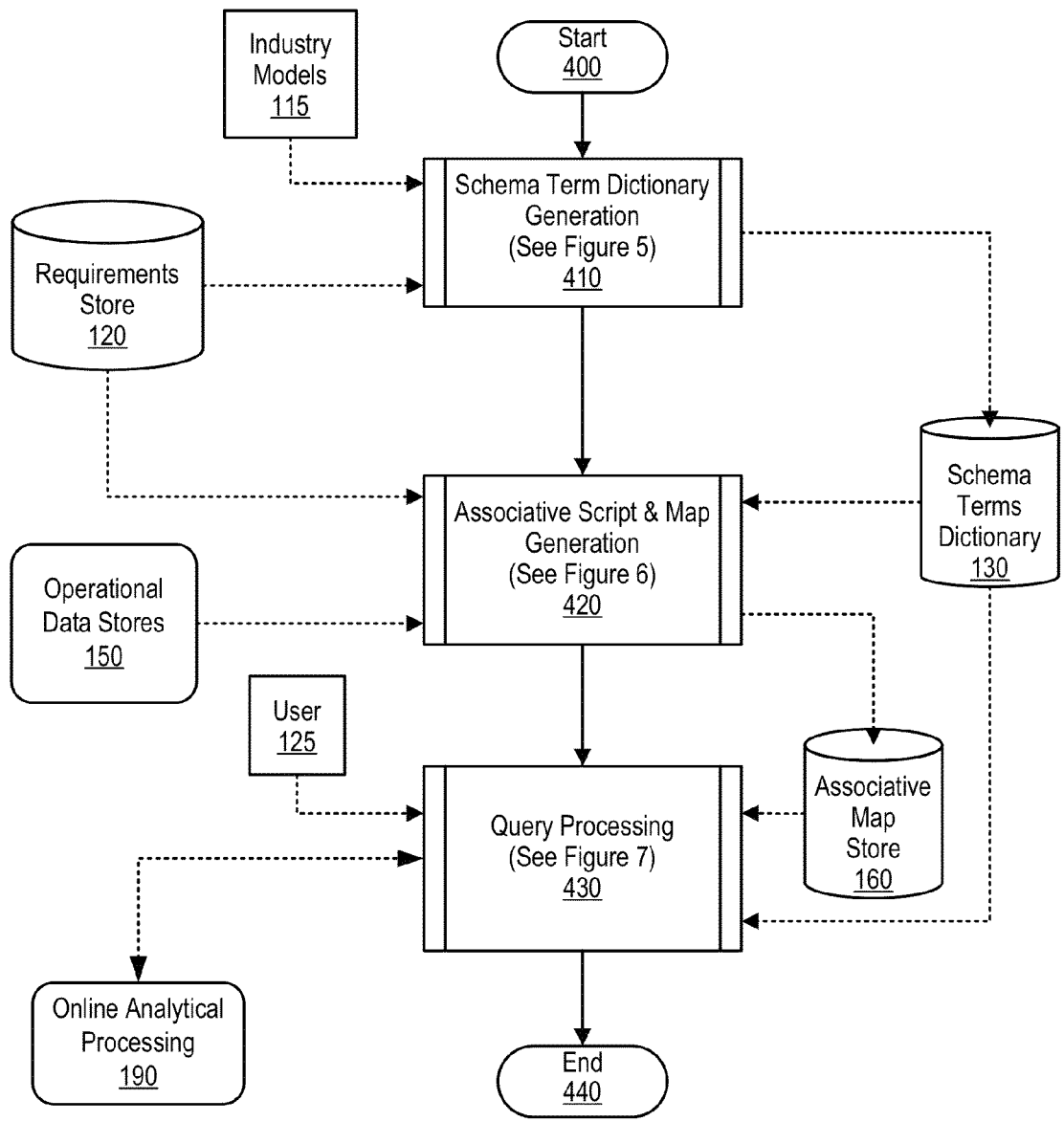
FIG. 4 is a flowchart showing steps taken in creating schema terms and using the schema terms to dynamically generate an associative map and a query.

FIG. 4 is a flowchart showing steps taken in creating schema terms and using the schema terms to dynamically generate an associative map and a query.

Figure 5:
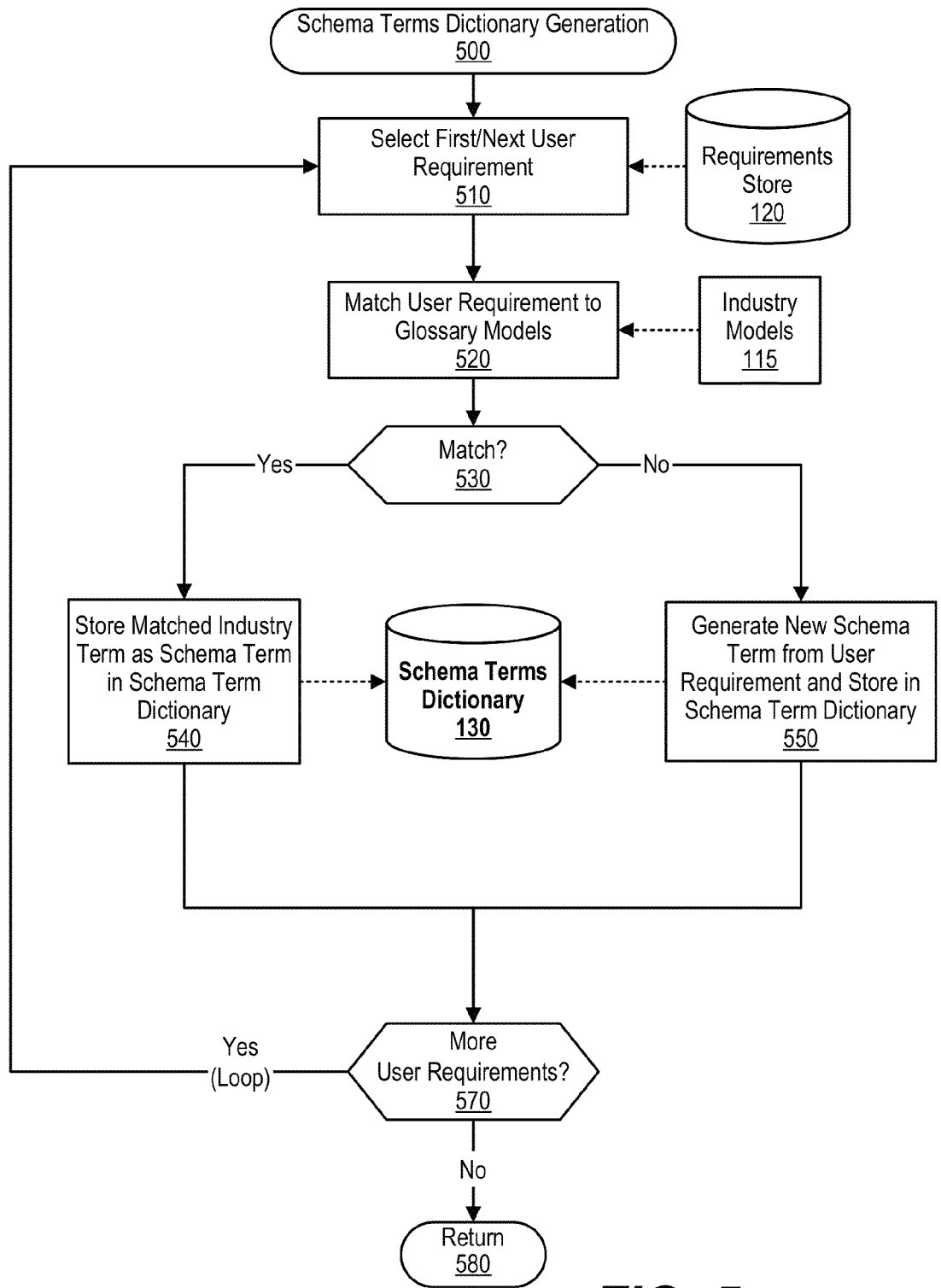
FIG. 5 is a flowchart showing steps taken in dynamically generating a schema terms dictionary.

Processing commences at 400, whereupon a feed adapter IDE generates a schema terms dictionary (stored in schema terms dictionary 130) based upon industry models 115 and general user data requirements stored in requirements store 120 (pre-defined process block 410, see FIG. 5 and corresponding text for further details). The general user data requirements may be industry standard requirements that are utilized across a number of specialized fields (e.g., general health care requirements). The feed adapter IDE matches the general user data requirements to industry terms included in industry models 115 and creates a schema term corresponding to the matched industry term and/or unmatched general user data requirements.

Next, the feed adapter IDE matches application-specific data requirements included in requirements store 120 to the industry terms and creates additional application-specific schema terms accordingly. In turn, the feed adapter IDE creates a mapping script using the schema terms and sends the script to one or more feed adapters, which executes the mapping script program and creates an associative map (stored in associative map store 160) by extracting data from operational data stores 150 according to the schema terms (pre-defined process block 420, see FIG. 6 and corresponding text for further details).

User 125 interfaces with a map/reduce applications IDE to view the schema terms stored in schema terms dictionary 130 and dynamically creates a query script. User 125 may dynamically create the query script because the schema terms identify data available in associative map store 160. In turn, map/reduce applications 180 retrieve data from the associative map and load the data into online analytical processing 190's storage areas (pre-defined process block 430, see FIG. 7 and corresponding text for further details). Processing ends at 440.

FIG. 5 is a flowchart showing steps taken in dynamically generating a schema terms dictionary. Processing creates the schema terms dictionary from industry terms, which are utilized as associative map key names (e.g., for key value pairs) and associative map column names during the generation of an associative map script (see FIG. 6 and corresponding text for further details).

Processing commences at 500, whereupon processing selects a first general user data requirement from requirements 120 at step 510. At step 520, processing matches the selected general user data requirement with industry terms included in industry models 115 using feed adapters IDE 110. In one embodiment, processing presents a list of matching industry terms to a feed adapter developer in order for the feed adapter developer to select a suitable industry term to correspond with the selected general user data requirement.

A determination is made as to whether processing matched the general user data requirement with one of the industry terms (decision 530). If there is a match, decision 530 branches to the "Yes" branch, whereupon processing creates a schema term that corresponds to the matched industry term that, in one embodiment, includes directory hierarchy information (step 540). Processing stores the schema term in schema terms dictionary 130.

On the other hand, if no match exists between the general user data requirement and the industry terms (e.g., glossary model terms), decision 530 branches to the "No" branch, whereupon processing generates a new schema term based upon the general user data requirement and stores the new schema term in schema terms dictionary 130 at step 550. In one embodiment, the new schema term may be selected by a feed adapter developer.

A determination is made as to whether there are more general user data requirements to process in requirements 120 (decision 570). If there are more general user data requirements to process, decision 570 branches to the "Yes" branch, which loops back to select and process the next general user data requirement. This looping continues until there are no more general user data requirements to process, at which point decisions 570 branches to the "No" branch and returns at 580.

Figure 6:
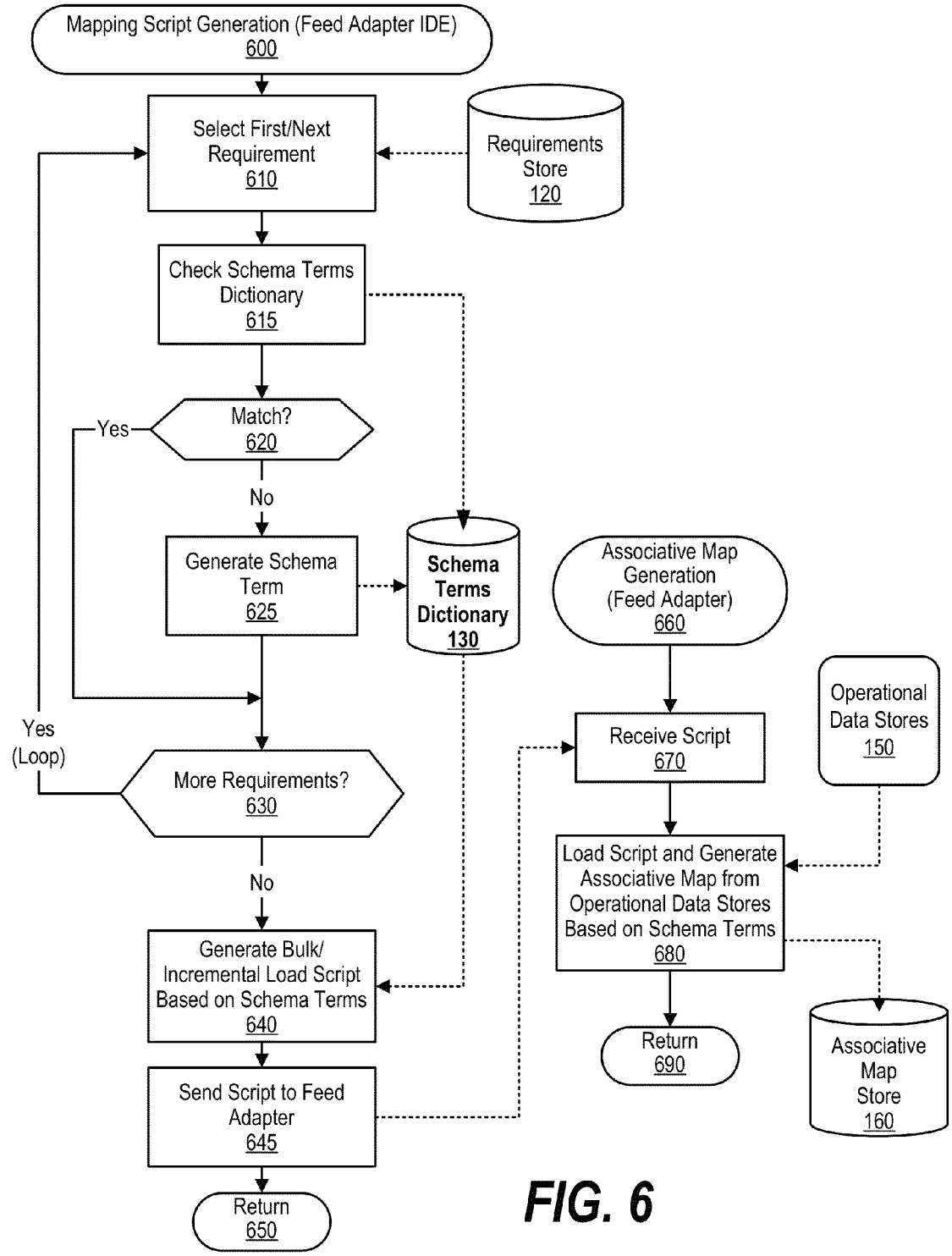
FIG. 6 is a flowchart showing steps taken in generating a mapping script and a corresponding associative map based upon schema terms generated from user data requirements.

FIG. 6 is a flowchart showing steps taken in generating and executing a mapping script to create an associative map based upon schema terms generated from user data requirements.

Processing commences at 600, whereupon a feed adapter IDE selects a first requirement (general user data requirement or application-specific data requirement) from requirements store 120 at step 610. At step 615, processing accesses schema terms dictionary 130 to check whether an existing schema term corresponds to the selected requirement. In one embodiment, although schema terms dictionary 130 was generated based upon general user data requirements (see FIG. 5), a user may have included application-specific data requirements in requirements store 120 that are particular to a business application.

A determination is made as to whether the selected requirement is represented in schema terms dictionary 130 (decision 620). If schema terms dictionary 130 includes a schema term that corresponds to the selected requirement, decision 620 branches to the "Yes" branch, bypassing step 625. On the other hand, if no schema term exists, decision 620 branches to the "No" branch, whereupon the feed adapter IDE generates a new schema term by matching the selected requirement to industry terms (e.g., glossary models) (see FIG. 5 and corresponding text for further details).

A determination is made as to whether there are more requirements for which to evaluate (decision 630). If there are more requirements for which to evaluate, decision 630 branches to the "Yes" branch, which loops back to select and process the next requirement. This looping continues until there are no more requirements to evaluate, at which point decision 630 branches to the "No" branch.

At step 640, the feed adapter IDE generates a mapping script according to the schema terms stored in schema terms dictionary 130. In one embodiment, the mapping scripts may include Java programs created by a feed adapter developer utilizing a feed adapter IDE, JDBC (Java Data Base Connectivity) API's, associative map APIs, and schema terms dictionary names. At step 645, the feed adapter IDE sends the generated mapping script to the feed adapter to execute. Feed adapter IDE processing returns at 650.

Feed adapter processing commences at 660, whereupon the feed adapter receives the mapping script at step 670. The feed adapter processes the script and, at step 680, generates an associative map (includes schema terms as column names and row keys) by extracting data from operational data stores 150 and loading the data in associative map store 160 according to the schema terms description arrangement (see FIG. 3 and corresponding text for further details). For example, as discussed above, the script may include Java programs involving JDBC API's, associative map APIs, and schema terms dictionary names. Processing returns at 690.

Figure 7:
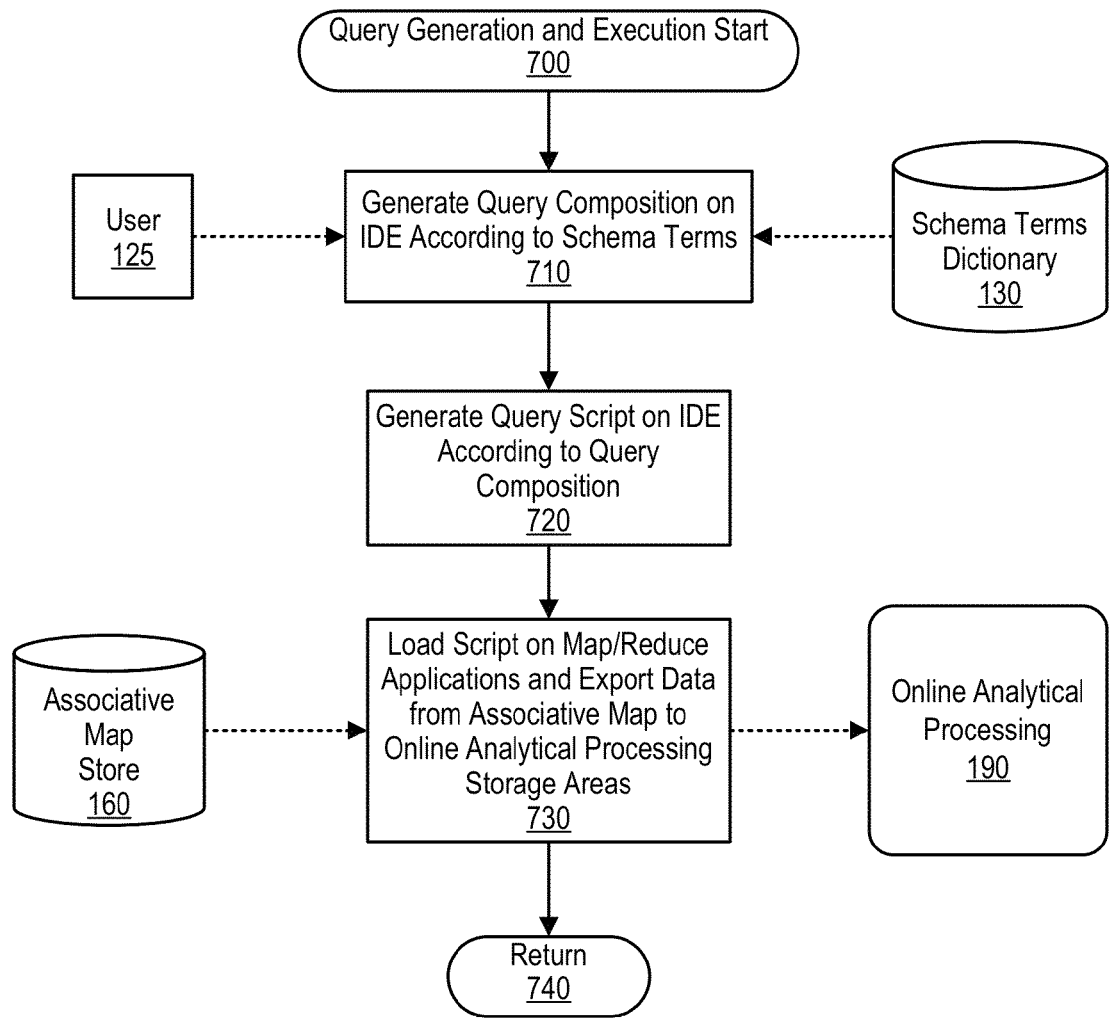
FIG. 7 is a flowchart showing steps taken in generating a query script and exporting data to online analytical processing storage areas.

FIG. 7 is a flowchart showing steps taken in generating a query script from schema terms and exporting data to online analytical processing storage areas according to the query script.

Processing commences at 700, whereupon a map/reduce applications IDE (e.g., IDE 170 shown in FIG. 1) receives input from user 125 to generate a query (step 710). The map/reduce applications IDE provides schema terms from schema terms dictionary 130 to user 125 such that user 125 may select particular schema terms to include in a query. At step 720, the map/reduce applications IDE generates a query script that includes the schema terms and provides the query script (e.g., query script 175) to a map/reduce application.

At step 730, the map/reduce application loads the script and exports data from the associative map stored in associative map store 160 to online analytical processing 190's storage areas for business analytics evaluation by user 125. Processing returns at 740.

Figure 8:
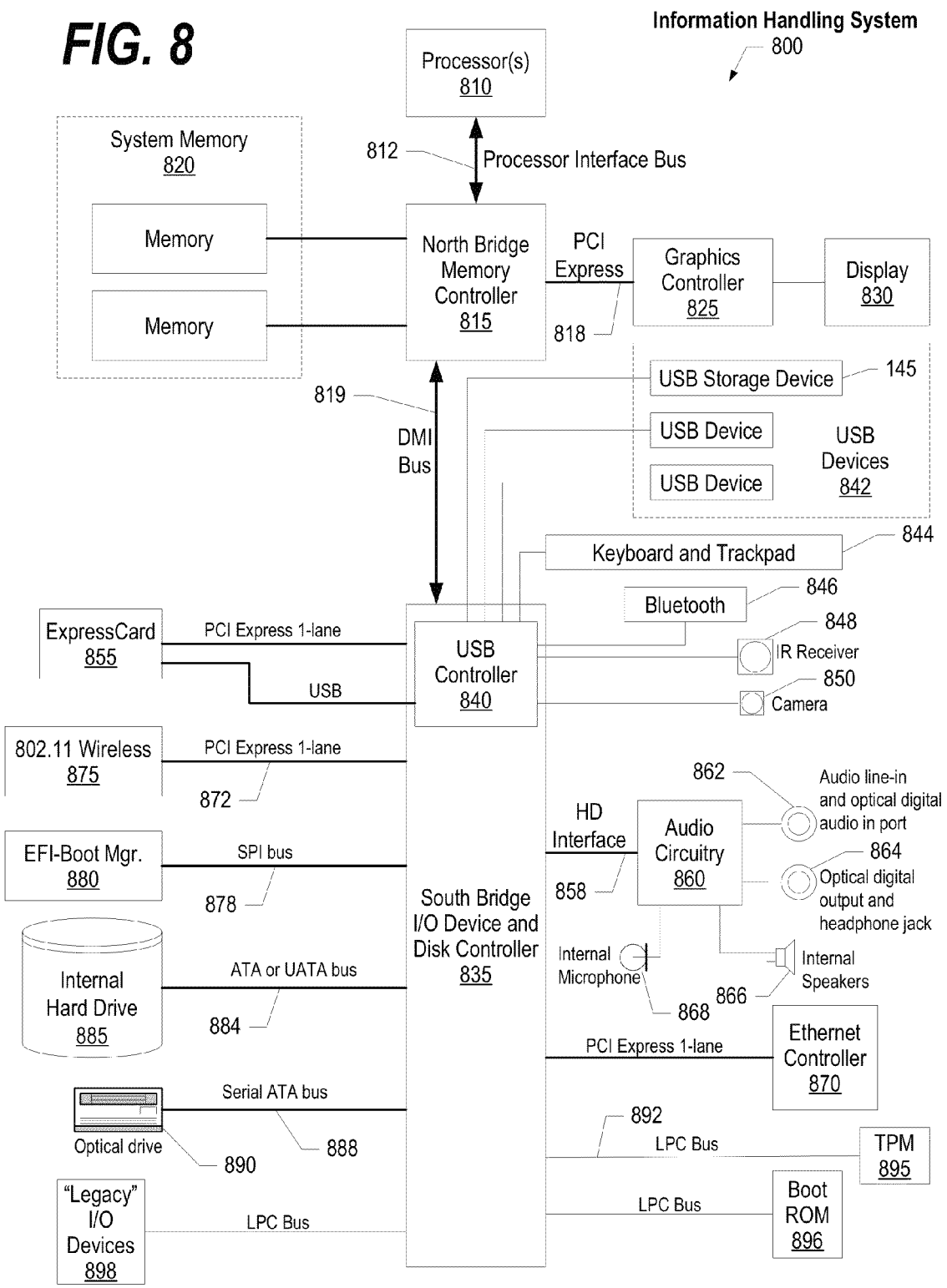
FIG. 8 is a block diagram of a data processing system in which the methods described herein can be implemented.

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
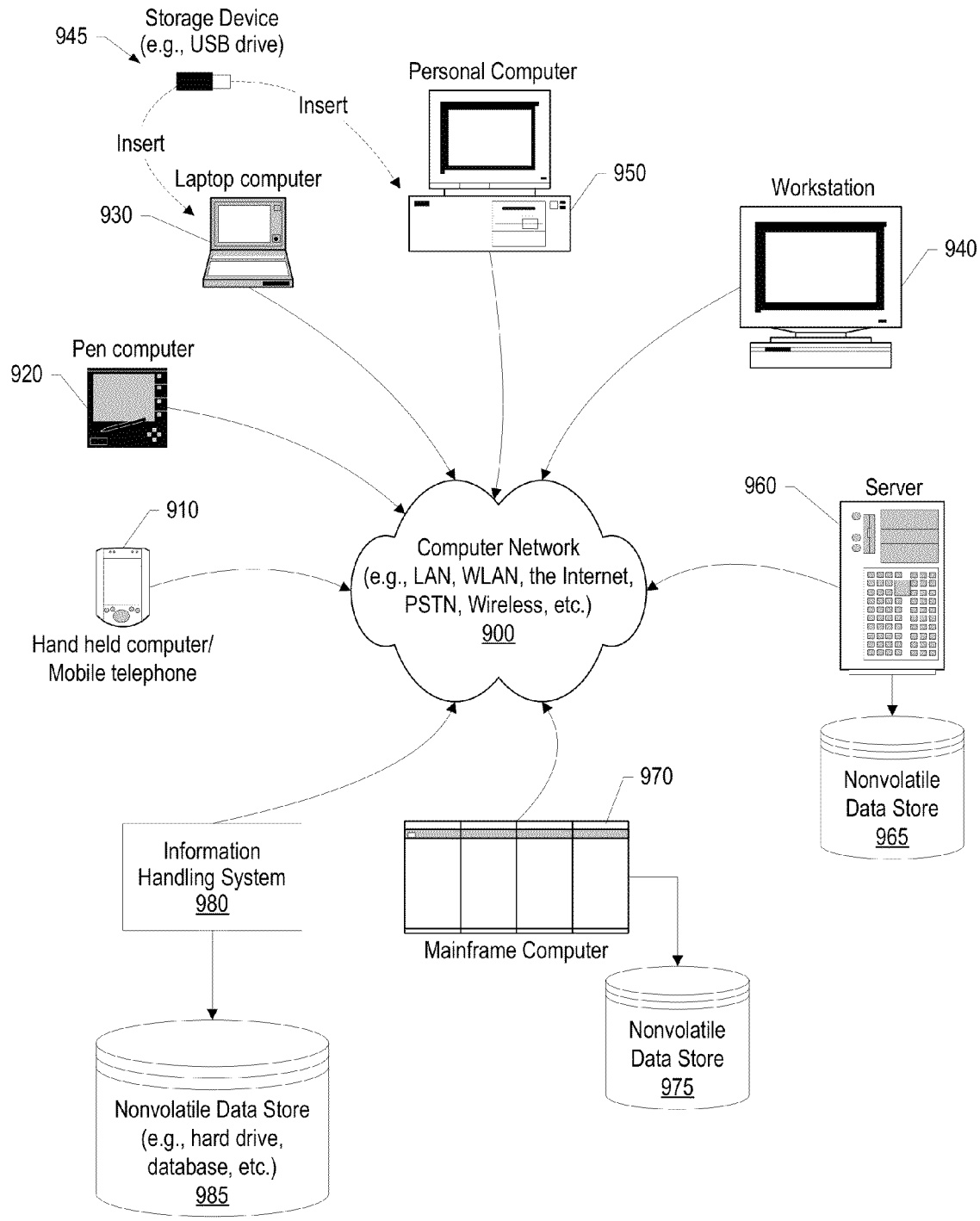
FIG. 9 provides an extension of the information handling system environment shown in FIG. 8 to illustrate that the methods described herein may be performed on a wide variety of information handling systems that operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    creating, by one or more processors, one or more schema terms based upon matching one or more general user data requirements to one or more industry terms;
    identifying, by one or more of the processors, one or more application-specific data requirements that fail to correspond to at least one of the one or more schema terms;
    creating, by one or more of the processors, one or more application-specific schema terms based upon matching the one or more identified application-specific data requirements to at least one of the one or more industry terms;
    generating, by one or more of the processors, an associative map that includes data organized according to the one or more application-specific schema terms;
    creating, by one or more of the processors, a query based upon at least one of the one or more application-specific schema terms; and
    executing the query on the associative map, wherein the execution of the query retrieves the data from the associative map and loads the data in one or more storage areas accessible to a user.

2. The method of claim 1 further comprising:
    storing the one or more schema terms in a schema terms dictionary;

providing the one or more schema terms stored in the schema terms dictionary to a user;

receiving one or more schema term selections from the user that selects one or more of the schema terms; and including the selected schema terms in the query during the creation of the query.

3. The method of claim 2 wherein the one or more storage areas are accessible to the user for analytical processing.

4. The method of claim 1 further comprising:

generating a mapping script based upon the one or more application-specific schema terms; and sending the mapping script to one or more feed adapters.

5. The method of claim 4 further comprising:

executing the mapping script by the one or more feed adapters, wherein the execution retrieves the data from one or more operational data storage areas and stores the data in the associative map.

6. The method of claim 1 further comprising:

creating an application-specific mapping script that includes the one or more application-specific schema terms;

executing the application-specific mapping script, wherein the execution of the application-specific mapping script retrieves application-specific data corresponding to the one or more application-specific schema terms from one or more operational data storage areas and adds the application-specific data to the associative map;

providing the one or more application-specific schema terms to a user;

receiving one or more application-specific schema term selections from the user that selects one or more of the application-specific schema terms;

including the selected application-specific schema terms in an application-specific query; and executing the application-specific query on the associative map, resulting in identification of the application-specific data and the loading of the identified application-specific data in at least one of the one or more storage areas.

7. The method of claim 1 wherein:

the associative map is an associative map table that includes one or more column headers corresponding to one or more of the application-specific schema terms; and the associative map table includes one or more row tags corresponding to one or more of the application-specific schema terms.

8. A method comprising:

creating, by one or more processors, one or more schema terms based upon matching one or more general user data requirements to one or more industry terms;

retrieving one or more application specific data requirements from computer memory;

identifying, by one or more of the processors, one or more of the application specific data requirements that fail to correspond to at least one of the one or more schema terms;

creating, by one or more of the processors, one or more application-specific schema terms based upon matching the one or more identified application-specific data requirements to at least one of the one or more industry terms;

creating, by one or more of the processors, an application-specific mapping script that includes the one or more application-specific schema terms;

executing, by one or more of the processors, the application-specific mapping script, wherein the execution of the application-specific mapping script retrieves application-specific data corresponding to the one or more application-specific schema terms from one or more operational data storage areas and includes the application-specific data in an associative map;

providing the one or more application-specific schema terms to a user;

receiving one or more application-specific schema term selections from the user that selects one or more of the application-specific schema terms;

including the selected application-specific schema terms in an application-specific query; and executing the application-specific query on the associative map, wherein the execution of the application-specific query retrieves the application-specific data from the associative map and loads the application-specific data in one or more storage areas accessible to the user to perform business analytics on the loaded application-specific data.

* * * * *